US006549344B2

(12) United States Patent
Tsutsumi

(10) Patent No.: US 6,549,344 B2
(45) Date of Patent: Apr. 15, 2003

(54) RETRO FOCUS TYPE WIDE-ANGLE LENS APPARATUS USING THE SAME

(75) Inventor: Katsuhisa Tsutsumi, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 178 days.

(21) Appl. No.: 09/862,324

(22) Filed: May 23, 2001

(65) Prior Publication Data

US 2002/0012177 A1 Jan. 31, 2002

(30) Foreign Application Priority Data

Jun. 15, 2000 (JP) .................................. 2000-180359

(51) Int. Cl.$^7$ .............................. G02B 13/04; G02B 9/62
(52) U.S. Cl. ...................................... 359/752; 359/761
(58) Field of Search ................................ 359/749–752, 359/754–756, 761, 738–740, 680–682

(56) References Cited

U.S. PATENT DOCUMENTS 3,589,798 A * 6/1971 Ogura ........................ 359/725
3,597,049 A * 8/1971 Ogura ........................ 359/725

FOREIGN PATENT DOCUMENTS

JP          2-96107       *   4/1990

OTHER PUBLICATIONS

Japanese Patent Office, Japanese Unexamined Patent Publication No.: 9–21321, Publication Date: Aug. 15, 1997, Application No.: 8–20120, Filling Date: Feb. 6, 1996, pp. 1–9. (English Language Abstract Provided).
Japanese Patent Office, Japanese Unexamined Patent Publication No.: 59–155817, Publication Date: Sep. 5, 1984, Application No.: 58–29389, Filling Date: Feb. 25, 1983, pp. 123–126 (English Language Abstract Provided).

* cited by examiner

Primary Examiner—Jordan M. Schwartz
(74) Attorney, Agent, or Firm—Snider & Associates; Ronald R. Snider

(57) ABSTRACT

A retro focus type wide-angle lens comprises a front group having a negative refracting power and a rear group having a positive refracting power. The front group comprises a first lens made of a negative meniscus lens, a second lens made of a biconvex lens, a third lens made of a negative meniscus lens, and a fourth lens made of a positive meniscus lens. The rear group comprises a cemented lens in which a fifth lens made of a negative lens and a sixth lens made of a positive lens are cemented together, and a seventh lens made of a positive lens. This wide-angle lens further satisfies predetermined conditional expressions.

5 Claims, 8 Drawing Sheets

EXAMPLE 1

EXAMPLE 1

EXAMPLE 2

EXAMPLE 3

EXAMPLE 4

FIG.5C EXAMPLE 1
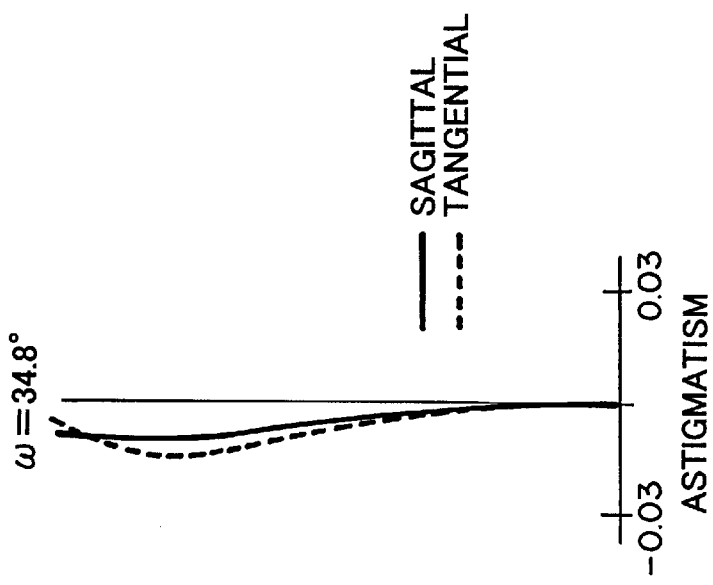
FIG.5B EXAMPLE 1
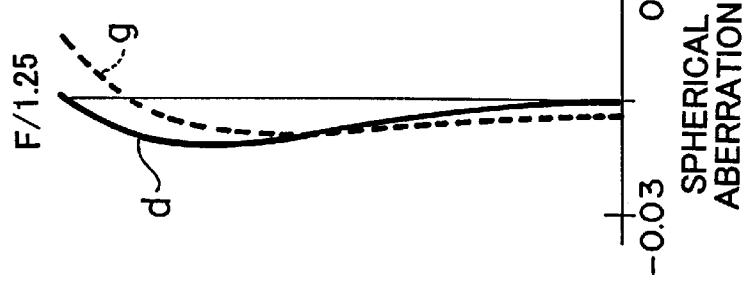
FIG.5A EXAMPLE 1

FIG.6A EXAMPLE 2
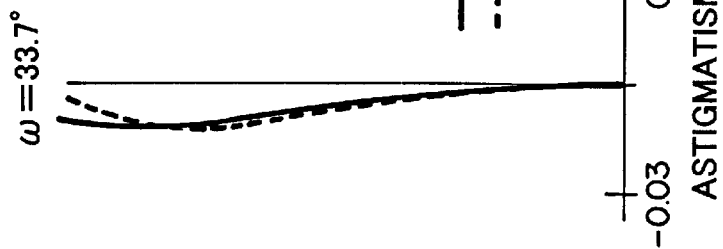
FIG.6B EXAMPLE 2
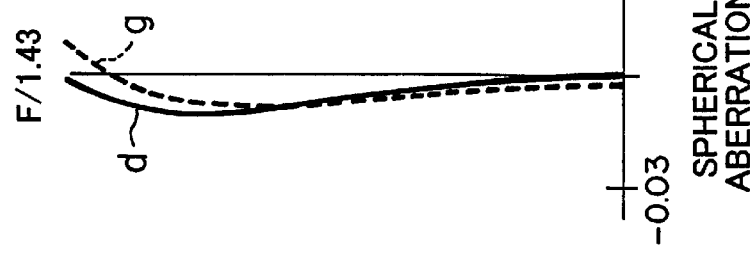
FIG.6C EXAMPLE 2

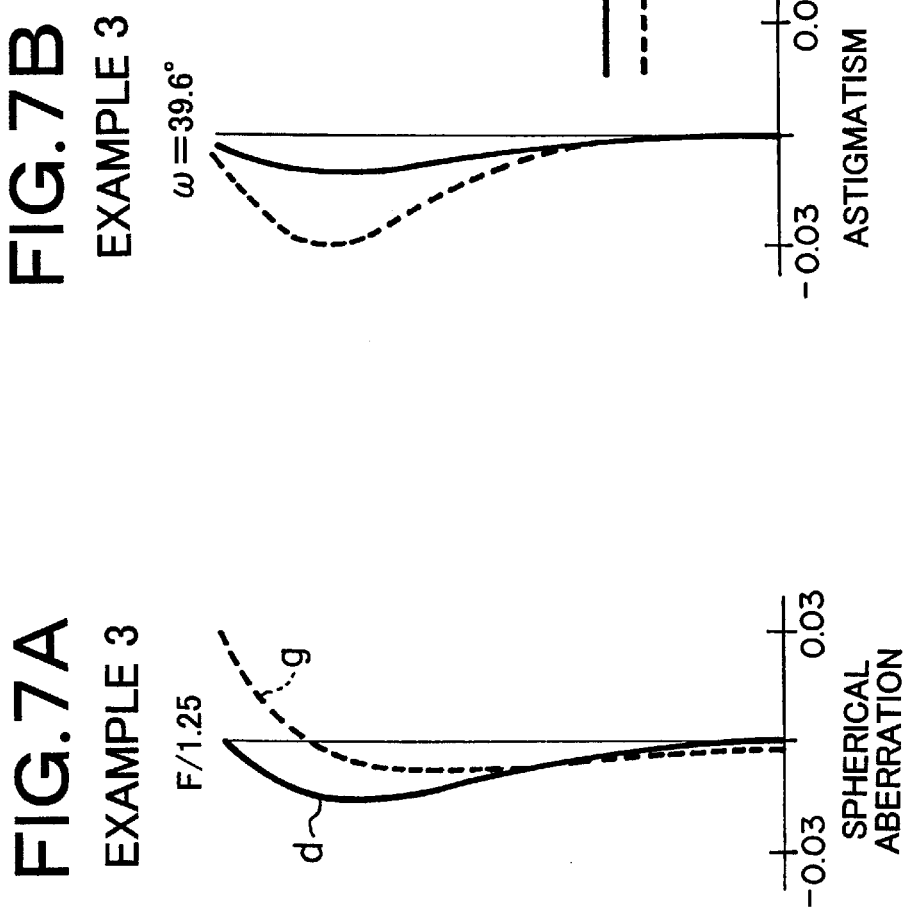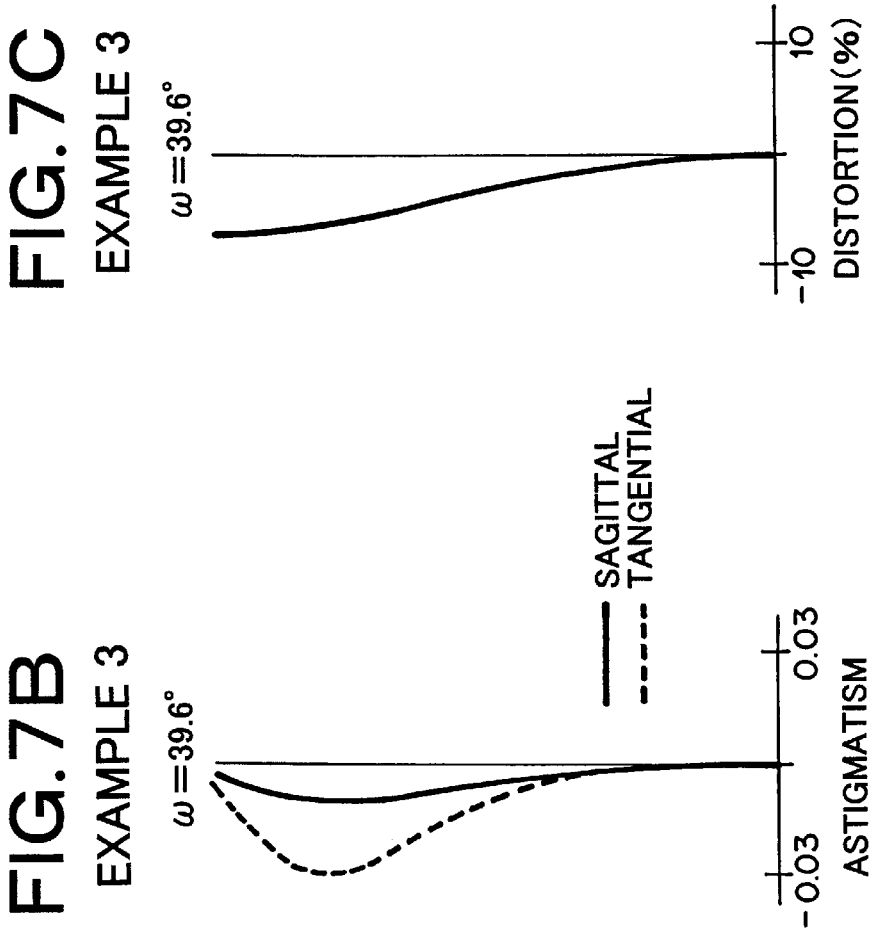

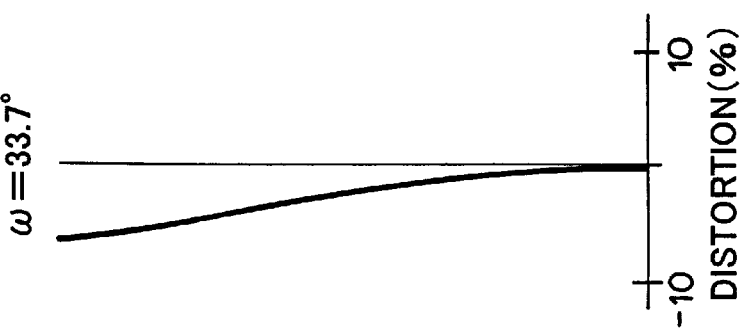
FIG.8C EXAMPLE 4
FIG.8B EXAMPLE 4
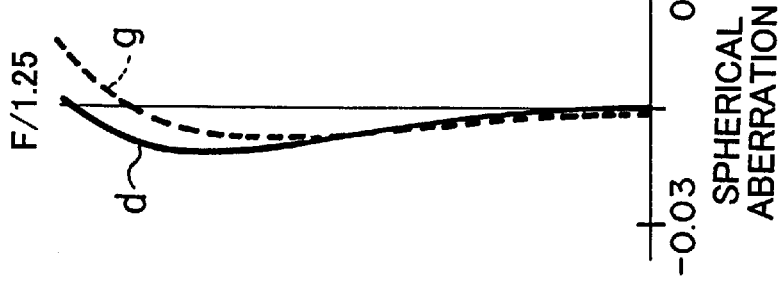
FIG.8A EXAMPLE 4

RETRO FOCUS TYPE WIDE-ANGLE LENS APPARATUS USING THE SAME

RELATED APPLICATIONS

This application claims the priority of Japanese Patent Application No. 2000-180359 filed on Jun. 15, 2000, which is incorporated herein by reference.

BACKGROUND OF THE INVENTION

1. Field of the Invention

The present invention relates to a retro focus type wide-angle lens; and, in particular, to a small-size, large-aperture retro focus type wide-angle lens favorably employed in a CCTV (closed-circuit television) camera equipped with a CCD for monitoring, factory automation, and the like.

2. Description of the Prior Art

Since lenses employed in monitoring cameras and the like are mostly used indoors, bright large-aperture lenses are required therefor. Further, a wide-angle lens system is required for a single camera to observe or photograph a wider area.

Known as conventional examples in which such a wide-angle lens is constituted by a retro focus type in which a front group having a negative refracting power and a rear group having a positive refracting power are successively disposed from the object side are lenses disclosed in Japanese Unexamined Patent Publication No. 59-155817 and No. 9-211321. Each of these lenses is a wide-angle lens having a compact configuration and exhibiting a certain degree of performance.

However, the former lens is dark with an F number of 1.8, whereas the latter lens is dark with an F number of 2.8 and has a narrow angle of view. Monitoring cameras are required to be used in darker places, whereby the advent of brighter lenses is waited for.

SUMMARY OF THE INVENTION

In view of such circumstances, it is an object of the present invention to provide a retro focus type wide-angle lens which is brighter than the conventional examples while being compact and maintaining favorable optical performances, and a lens apparatus using the same.

The present invention provides a retro focus type wide-angle lens comprising, successively from an object side, a front group having a negative refracting power and a rear group having a positive refracting power; the front group comprising, successively from the object side, a first lens made of a negative meniscus lens having a convex surface directed onto the object side, a second lens made of a biconvex lens, a third lens made of a negative meniscus lens having a convex surface directed onto the object side, and a fourth lens made of a positive meniscus lens having a concave surface directed onto the object side; the rear group comprising, successively from the object side, a cemented lens in which a fifth lens made of a negative lens and a sixth lens made of a positive lens are cemented together, and a seventh lens made of a positive lens having a convex surface directed onto the object side; the retro focus type wide-angle lens satisfying the following conditional expressions (1) and (2):

$$0.6 < f'/I < 0.85 \tag{1}$$

$$0.45 < |f'_{G1}/D_{G1\text{-}2}| < 0.88 \tag{2}$$

where
f' is the focal length of the whole system;
I is the diagonal length of an effective screen;
$f'_{G1}$ is the focal length of the system formed by the first to third lenses; and
$D_{G1\text{-}2}$ is the distance from the object-side surface of the first lens to the imaging-side surface of the fourth lens.

Preferably, the retro focus type wide-angle lens of the present invention satisfies the following conditional expression (3):

$$0.2 \leq D_{G2}/D_{G1\text{-}2} \leq 0.5 \tag{3}$$

where
$D_{G1\text{-}2}$ is the distance from the object-side surface of the first lens to the imaging-side surface of the fourth lens; and
$D_{G2}$ is the center thickness of the fourth lens.

A stop for restricting a marginal luminous flux may be disposed between the third and fourth lenses, whereas an aperture stop may be disposed between the fourth and fifth lenses.

Preferably, the retro focus type wide-angle lens has an F number set within the range from 1.25 to 1.43.

The present invention also provides a lens apparatus comprising the retro focus type wide-angle lens in accordance with the present invention.

BRIEF DESCRIPTION OF THE DRAWINGS

FIGS. 5A to 5C are aberration charts showing various kinds of aberration (spherical aberration, astigmatism, and distortion) of the retro focus type wide-angle lens in accordance with Example 1;

FIGS. 6A to 6C are aberration charts showing various kinds of aberration (spherical aberration, astigmatism, and distortion) of the retro focus type wide-angle lens in accordance with Example 2;

FIGS. 7A to 7C are aberration charts showing various kinds of aberration (spherical aberration, astigmatism, and distortion) of the retro focus type wide-angle lens in accordance with Example 3; and FIGS. 8A to 8C are aberration charts showing various kinds of aberration (spherical aberration, astigmatism, and distortion) of the retro focus type wide-angle lens in accordance with Example 4.

DESCRIPTION OF THE PREFERRED EMBODIMENTS

In the following, an embodiment of the present invention will be explained with reference to specific examples while using the drawings.

Figure 1:
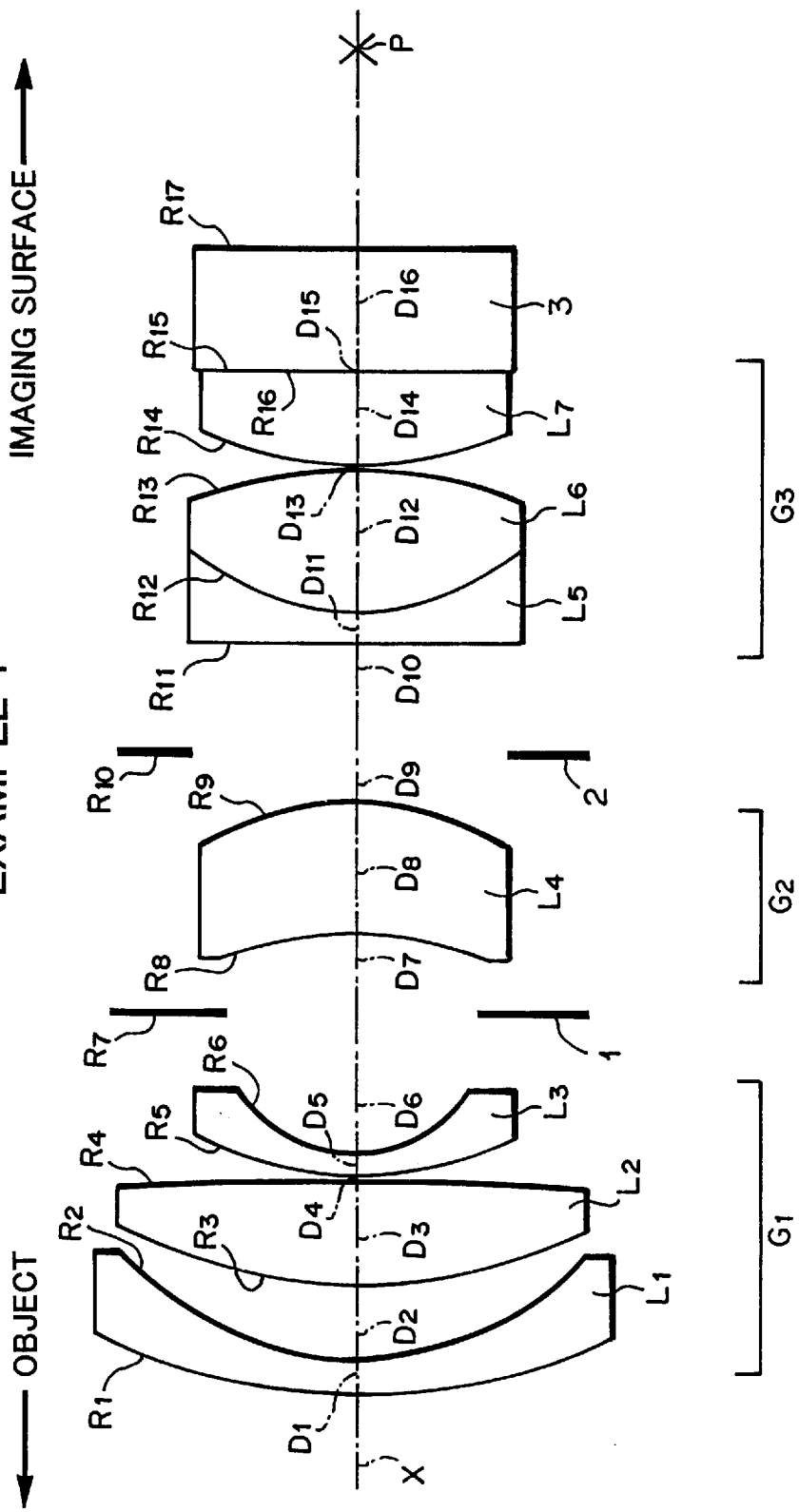
FIG. 1 is a view showing the configuration of the retro focus type wide-angle lens in accordance with Example 1.

FIG. 1 is a view showing the configuration of the retro focus type wide-angle lens in accordance with Example 1 representing an embodiment of the present invention. As depicted, the retro focus type wide-angle lens in accordance with this embodiment comprises, successively from the object side, a front group having a negative refracting power and a rear group having a positive refracting power. The front group comprises, successively from the object side, a first lens group $G_1$ having a negative refracting power and a second lens group $G_2$ having a positive refracting power, whereas the rear group comprises a third lens group $G_3$. A stop 1 is disposed between the first lens group $G_1$ and second lens group $G_2$ in order to restrict the marginal luminous flux. An aperture stop 2 is disposed between the second lens group $G_2$ and the third lens group $G_3$. A filter section 3 such as an infrared cutoff filter is disposed on the image surface side of the third lens group $G_3$. The luminous flux incident from the object side along the optical axis X forms an image at an imaging position P on an imaging surface (not depicted) of a solid-state imaging device (CCD).

Here, the first lens group $G_1$ comprises, successively from the object side, a first lens $L_1$ made of a negative meniscus lens having a convex surface directed onto the object side, a second lens $L_2$ made of a biconvex lens, and a third lens $L_3$ made of a negative meniscus lens having a convex surface directed onto the object side. The second lens group $G_2$ is constituted by a fourth lens $L_4$ made of a positive meniscus lens having a concave surface directed onto the object side. The third lens group $G_3$ comprises, successively from the object side, a cemented lens in which a fifth lens $L_5$ made of a negative lens and a sixth lens $L_6$ made of a positive lens are cemented together, and a seventh lens $L_7$ made of a positive lens having a convex surface directed onto the object side.

Also, the wide-angle lens in accordance with this embodiment satisfies the following conditional expressions (1) to (3):

$$0.6 < f'/I < 0.85 \tag{1}$$

$$0.45 < |f'_{G1}/D_{G1\text{-}2}| < 0.88 \tag{2}$$

$$0.2 \leq D_{G2}/D_{G1\text{-}2} \leq 0.5 \tag{3}$$

where
f' is the focal length of the whole system;
I is the diagonal length of an effective screen;
$f_{G1}$ is the focal length of the system formed by the first lens $L_1$ to the third lens $L_3$;
$D_{G1\text{-}2}$ is the distance from the object-side surface of the first lens $L_1$ to the imaging-side surface of the fourth lens $L_4$; and
$D_{G2}$ is the center thickness of the fourth lens $L_4$.

The above-mentioned conditional expressions (1) to (3) will now be explained.

The above-mentioned conditional expression (1) defines the ratio of the focal length of the whole system to the diagonal length of the effective screen. When this conditional expression (1) is satisfied, optical performances in the whole effective screen area can be maintained favorably while in a wide-angle lens with a large aperture ratio.

The above-mentioned conditional expression (2) is an expression for appropriately distributing the power of the first lens group $G_1$ from the first lens $L_1$ to the third lens $L_3$ in the front group having a negative refracting power. When this conditional expression (2) is satisfied, a wide-angle lens favorably correcting the aberration can be obtained while in a compact configuration with seven lens sheets in total. Coma flare will increase if the lower limit is not satisfied, whereas the amount of spherical aberration will increase if the upper limit is exceeded. These kinds of aberration can be kept in balance within the range defined by this conditional expression (2), whereby a bright optical system with an F number of 1.4 or less can be obtained while the aberration is corrected favorably.

The above-mentioned conditional expression (3) defines the ratio of the length on the optical axis of the front group having a negative refracting power to the center thickness of the fourth lens $L_4$. In general, the fourth lens $L_4$ made of a positive meniscus lens having a concave surface directed onto the object side can collect a greater amount of marginal illumination as its center thickness is larger, thus forming a brighter wide-angle lens as a whole. If the center thickness is smaller than the lower limit, the amount of marginal illumination will decrease when the F number is 1.4 or less, whereby marginal parts of the screen may darken upon full-aperture photographing. If the upper limit is exceeded, however, the center thickness of the fourth lens $L_4$ will be too large with respect to the outer diameter, which will make the processing difficult, and the distance to the third lens $L_3$ will be harder to secure.

Thus, the retro focus type wide-angle lens in accordance with the present invention is bright with an F number of 1.4 or less while being compact and maintaining favorable optical performances, thereby making it particularly suitable for monitoring cameras for which bright lenses are desired. Also, the retro focus type wide-angle lens of the present invention can be mounted in various optical apparatus other than monitoring cameras.

EXAMPLES

In the following, the retro focus type wide-angle lens of the present invention will be explained in detail with reference to specific examples.

Example 1

The retro focus type wide-angle lens in accordance with Example 1 is configured as shown in FIG. 1.

Namely, the first lens group $G_1$ comprises, successively from the object side, a first lens $L_1$ made of a negative meniscus lens having a convex surface directed onto the object side, a second lens $L_2$ made of a biconvex lens having a surface with a stronger curvature directed onto the object side, and a third lens $L_3$ made of a negative meniscus lens having a convex surface directed onto the object side. The second lens group $G_2$ is constituted by a fourth lens $L_4$ made of a positive meniscus lens having a concave surface directed onto the object side. The third lens group $G_3$ comprises, successively from the object side, a cemented lens in which a fifth lens $L_5$ made of a negative lens having a concave surface directed onto the imaging surface side and a sixth lens $L_6$ made of a biconvex lens having a surface with a stronger curvature directed onto the object side are cemented together, and a seventh lens $L_7$ made of a biconvex lens having a surface with a stronger curvature directed onto the object side.

Table 1 shows the radius of curvature R of each lens surface, the axial surface space of each lens (the center thickness of each lens and the air space between each pair of adjacent lenses) D, and the refractive index $N_d$ and Abbe number $\upsilon$ of each lens at d-line in Example 1. In Table 1 and its subsequent Tables 2 to 4, the numbers referring to each symbol successively increase from the object side, whereas each value in the tables is standardized with the focal length f' of the whole system being taken as 1.00.

Example 2

Figure 2:
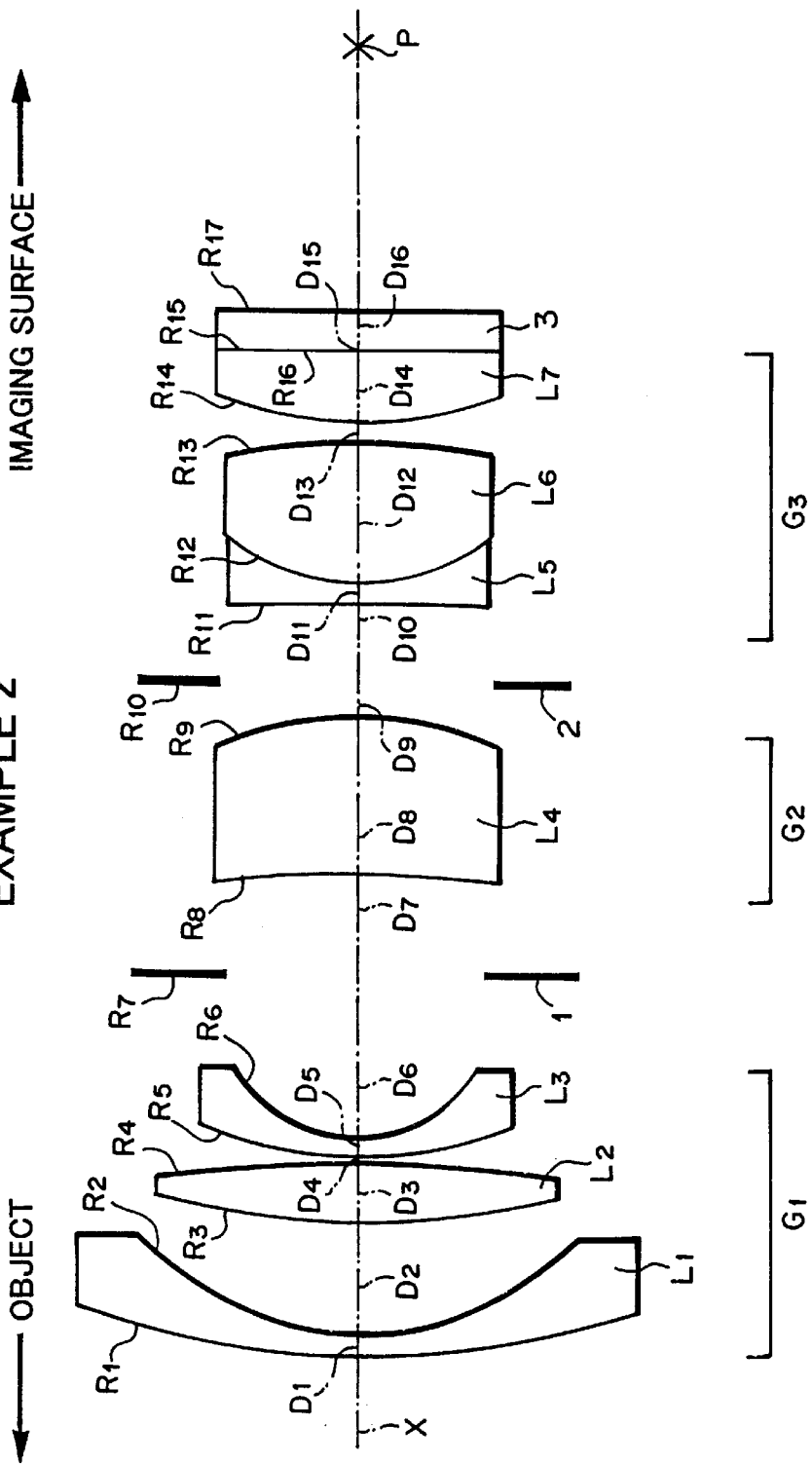
FIG. 2 is a view showing the configuration of the retro focus type wide-angle lens in accordance with Example 2.

The retro focus type wide-angle lens in accordance with Example 2 is configured as shown in FIG. 2.

Namely, the first lens group $G_1$ comprises, successively from the object side, a first lens $L_1$ made of a negative meniscus lens having a convex surface directed onto the object side, a second lens $L_2$ made of a biconvex lens having a surface with a stronger curvature directed onto the object side, and a third lens $L_3$ made of a negative meniscus lens having a convex surface directed onto the object side. The second lens group $G_2$ is constituted by a fourth lens $L_4$ made of a positive meniscus lens having a concave surface directed onto the object side. The third lens group $G_3$ comprises a cemented lens in which a fifth lens $L_5$ made of a biconcave lens having a surface with a stronger curvature directed onto the imaging surface side and a sixth lens $L_6$ made of a biconvex lens having a surface with a stronger curvature directed onto the object side are cemented together, and a seventh lens $L_7$ made of a positive meniscus lens having a convex surface directed onto the object side.

Table 2 shows the radius of curvature R of each lens surface, the axial surface space of each lens (the center thickness of each lens and the air space between each pair of adjacent lenses) D, and the refractive index $N_d$ and Abbe number υ of each lens at d-line in Example 2.

Example 3

Figure 3:
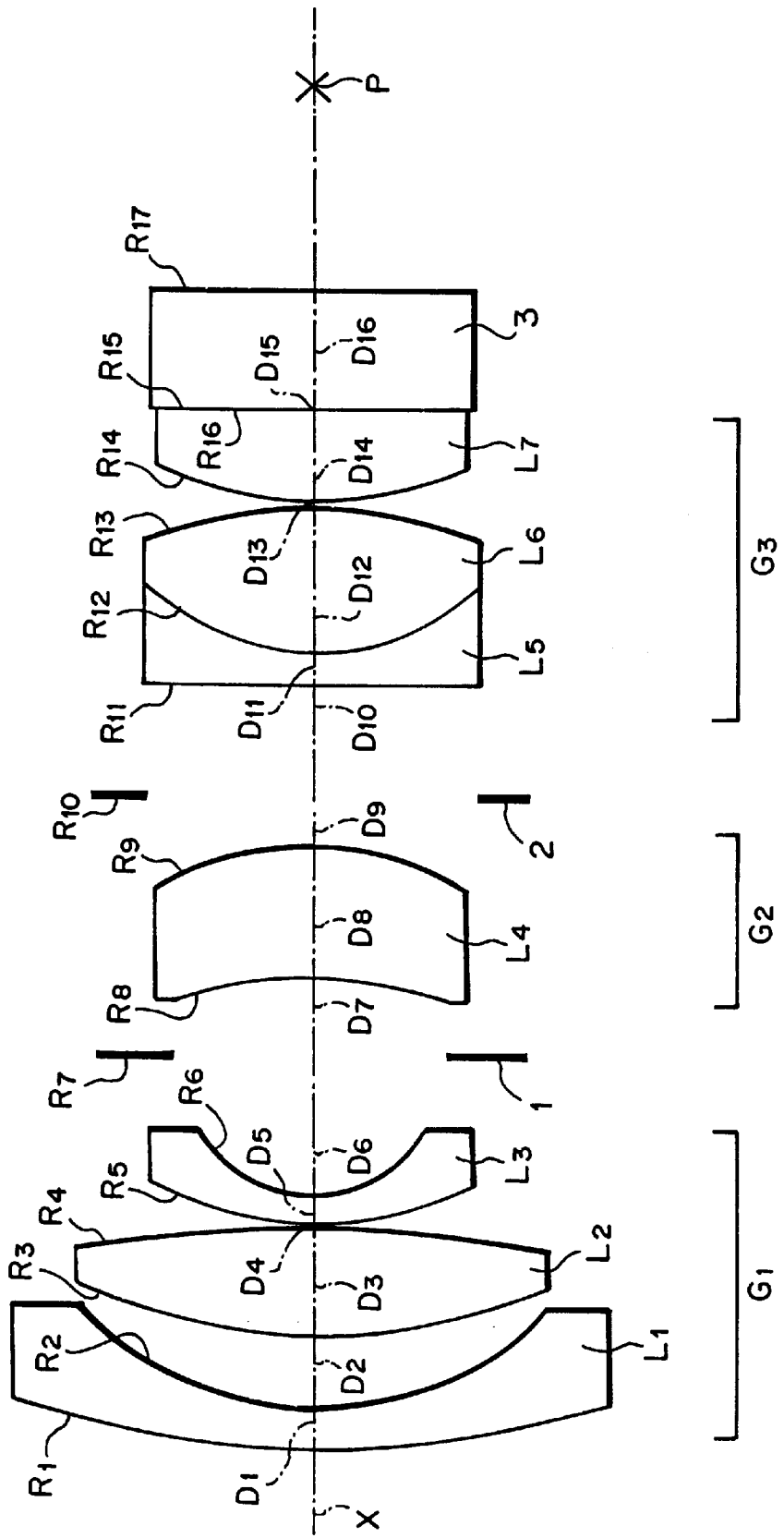
FIG. 3 is a view showing the configuration of the retro focus type wide-angle lens in accordance with Example 3.

The retro focus type wide-angle lens in accordance with Example 3 is configured as shown in FIG. 3.

Namely, the first lens group $G_1$ comprises, successively from the object side, a first lens $L_1$ made of a negative meniscus lens having a convex surface directed onto the object side, a second lens $L_2$ made of a biconvex lens having a surface with a stronger curvature directed onto the object side, and a third lens $L_3$ made of a negative meniscus lens having a convex surface directed onto the object side. The second lens group $G_2$ is constituted by a fourth lens $L_4$ made of a positive meniscus lens having a concave surface directed onto the object side. The third lens group $G_3$ comprises a cemented lens in which a fifth lens $L_5$ made of a negative meniscus lens having a convex surface directed onto the imaging surface side and a sixth lens $L_6$ made of a biconvex lens having a surface with a stronger curvature directed onto the object side are cemented together, and a seventh lens $L_7$ made of a positive meniscus lens having a convex surface directed onto the object side.

Table 3 shows the radius of curvature R of each lens surface, the axial surface space of each lens (the center thickness of each lens and the air space between each pair of adjacent lenses) D, and the refractive index $N_d$ and Abbe number υ of each lens at d-line in Example 3.

Example 4

Figure 4:
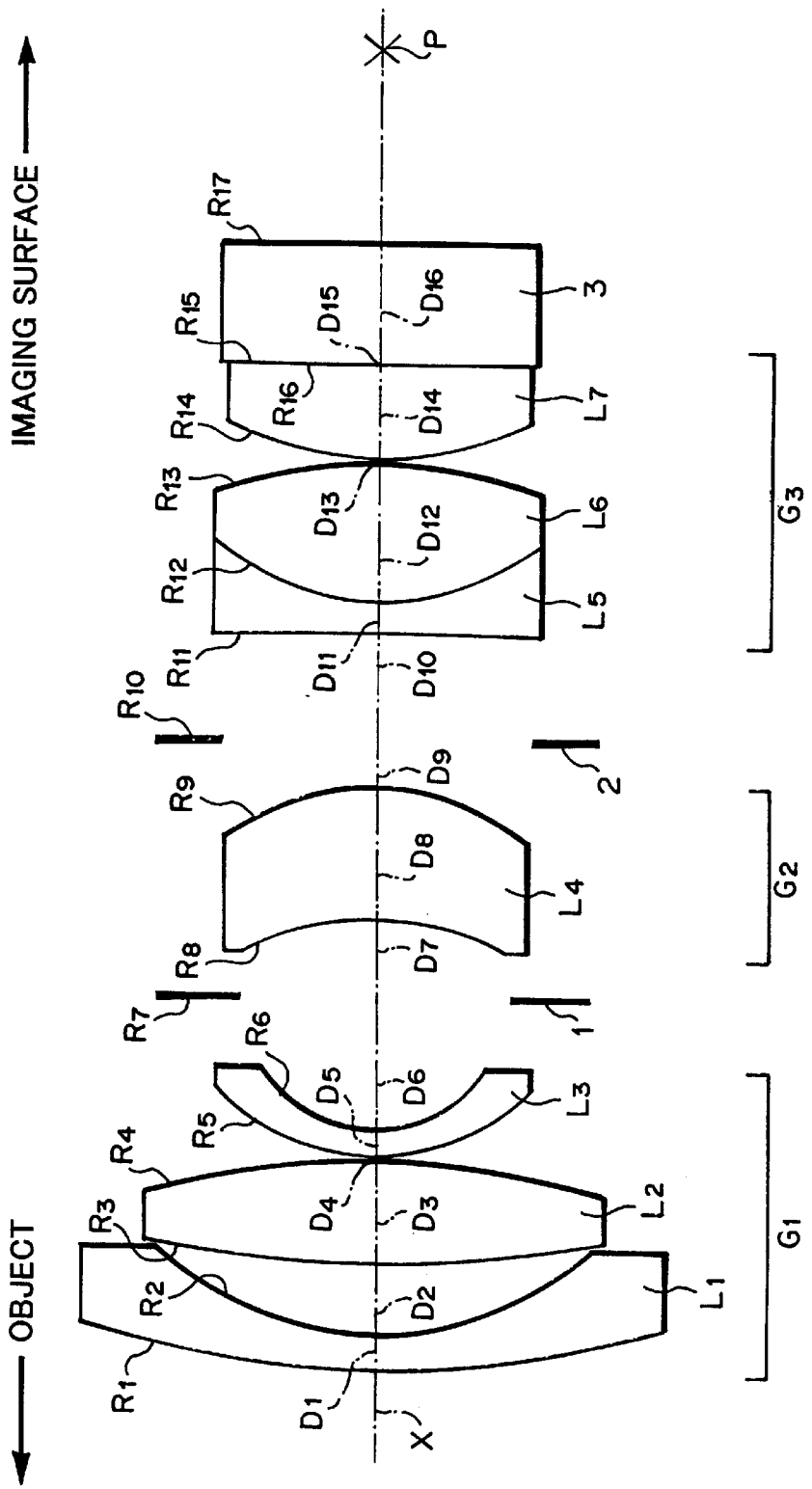
FIG. 4 is a view showing the configuration of the retro focus type wide-angle lens in accordance with Example 4.

The retro focus type wide-angle lens in accordance with Example 4 is configured as shown in FIG. 4.

Namely, the first lens group $G_1$ comprises, successively from the object side, a first lens $L_1$ made of a negative meniscus lens having a convex surface directed onto the object side, a second lens $L_2$ made of a biconvex lens having a surface with a stronger curvature directed onto the imaging surface side, and a third lens $L_3$ made of a negative meniscus lens having a convex surface directed onto the object side. The second lens group $G_2$ is constituted by a fourth lens $L_4$ made of a positive meniscus lens having a concave surface directed onto the object side. The third lens group $G_3$ comprises a cemented lens in which a fifth lens $L_5$ made of a biconcave lens having a surface with a stronger curvature directed onto the imaging surface side and a sixth lens $L_6$ made of a biconvex lens having a surface with a stronger curvature directed onto the object side are cemented together, and a seventh lens $L_7$ made of a positive meniscus lens having a convex surface directed onto the object side.

Table 4 shows the radius of curvature R of each lens surface, the axial surface space of each lens (the center thickness of each lens and the air space between each pair of adjacent lenses) D, and the refractive index $N_d$ and Abbe number υ of each lens at d-line in Example 4.

The upper part of Table 5 shows the focal length f' of the whole system, the diagonal length I of effective screen, the focal length $f'_{G1}$ of the system constituted by the first lens $L_1$ to third lens $L_3$, the distance $D_{G1-2}$ from the object-side surface of the first lens $L_1$ to the imaging-side surface of the fourth lens $L_4$, the center thickness $D_{G2}$ of the fourth lens $L_4$, and the F number Fno in each of the retro focus type wide-angle lenses in accordance with Examples 1 to 4. The lower part of Table 5 shows the values corresponding to the above-mentioned conditional expressions (1) to (3) in each of Examples 1 to 4.

FIGS. 5A to 8C are aberration charts showing various kinds of aberration (spherical aberration, astigmatism, and distortion) in the retro focus type wide-angle lenses in accordance with Examples 1 to 4. In these aberration charts, ω indicates the half angle of view. Each aberration chart for spherical aberration shows aberrations at d- and g-lines, whereas each aberration chart for astigmatism shows respective aberrations in sagittal and tangential image surfaces.

As can be seen from Table 5 and FIGS. 5A to 8C, each of the wide-angle lenses of Examples 1 to 4 is a high-performance retro focus type wide-angle lens which satisfies all of the above-mentioned conditional expressions (1) to (3), has a wide angle with a bright F number of 1.25 to 1.43, and can favorably correct each kind of aberration.

Without being restricted to the above-mentioned examples, the retro focus type wide-angle lens of the present invention and the lens apparatus using the same can be modified in various manners. For example, the number and form of lenses constituting each lens group can be modified as appropriate.

As explained in the foregoing, the retro focus type wide-angle lens in accordance with the present invention comprises, successively from the object side, a negative front group and a positive rear group with seven lens sheets in predetermined forms and satisfies predetermined conditional expressions, thereby making it possible to yield a bright retro focus type wide-angle lens with an F number of 1.4 or less while maintaining favorable optical performances and a lens apparatus using the same.

TABLE 1

| Surface | R | D | $N_d$ | ν |
|---|---|---|---|---|
| 1 | 4.010 | 0.24 | 1.77250 | 49.6 |
| 2 | 2.053 | 0.49 | | |
| 3 | 3.413 | 0.70 | 1.80517 | 25.4 |
| 4 | −31.731 | 0.03 | | |
| 5 | 2.289 | 0.16 | 1.77250 | 49.6 |
| 6 | 0.891 | 0.91 | | |
| 7 | ∞ | 0.52 | | |
| 8 | −2.478 | 0.89 | 1.71299 | 53.8 |
| 9 | −1.882 | 0.31 | | |
| 10 | ∞ | 0.72 | | |
| 11 | 47.662 | 0.21 | 1.80517 | 25.4 |
| 12 | 1.633 | 0.94 | 1.71299 | 53.8 |
| 13 | −3.235 | 0.03 | | |
| 14 | 2.518 | 0.62 | 1.77250 | 49.6 |
| 15 | −101.693 | 0.00 | | |
| 16 | ∞ | 0.81 | 1.51632 | 64.0 |
| 17 | ∞ | 1.32 | | |

TABLE 2

| Surface | R | D | $N_d$ | ν |
|---|---|---|---|---|
| 1 | 5.003 | 0.11 | 1.51633 | 64.0 |
| 2 | 1.686 | 0.62 | | |
| 3 | 4.449 | 0.34 | 1.71735 | 29.5 |
| 4 | −7.878 | 0.03 | | |
| 5 | 2.336 | 0.11 | 1.58913 | 61.2 |
| 6 | 0.780 | 0.91 | | |
| 7 | ∞ | 0.57 | | |
| 8 | −7.553 | 0.91 | 1.74300 | 49.2 |
| 9 | −1.821 | 0.17 | | |
| 10 | ∞ | 0.45 | | |
| 11 | −21.581 | 0.11 | 1.80517 | 25.4 |
| 12 | 1.178 | 0.80 | 1.74400 | 44.8 |
| 13 | −3.715 | 0.11 | | |
| 14 | 2.290 | 0.40 | 1.71300 | 53.9 |
| 15 | 51.572 | 0.00 | | |
| 16 | ∞ | 0.23 | 1.51633 | 64.0 |
| 17 | ∞ | 1.50 | | |

TABLE 3

| Surface | R | D | $N_d$ | ν |
|---|---|---|---|---|
| 1 | 7.929 | 0.28 | 1.77250 | 49.6 |
| 2 | 2.467 | 0.57 | | |
| 3 | 4.528 | 0.82 | 1.80517 | 25.4 |
| 4 | −10.587 | 0.04 | | |
| 5 | 2.793 | 0.19 | 1.77250 | 49.6 |
| 6 | 1.023 | 1.07 | | |
| 7 | ∞ | 0.61 | | |
| 8 | −3.218 | 1.05 | 1.71299 | 53.8 |
| 9 | −2.322 | 0.36 | | |
| 10 | ∞ | 0.85 | | |
| 11 | 197.034 | 0.25 | 1.80517 | 25.4 |
| 12 | 1.868 | 1.11 | 1.71299 | 53.8 |
| 13 | −3.475 | 0.04 | | |
| 14 | 2.892 | 0.73 | 1.77250 | 49.6 |
| 15 | 2807.550 | 0.00 | | |
| 16 | ∞ | 0.96 | 1.51632 | 64.0 |
| 17 | ∞ | 1.56 | | |

TABLE 4

| Surface | R | D | $N_d$ | ν |
|---|---|---|---|---|
| 1 | 6.435 | 0.23 | 1.77250 | 49.6 |
| 2 | 2.032 | 0.47 | | |
| 3 | 7.799 | 0.67 | 1.80517 | 25.4 |
| 4 | −5.342 | 0.03 | | |
| 5 | 1.413 | 0.16 | 1.77250 | 49.6 |
| 6 | 0.850 | 0.87 | | |
| 7 | ∞ | 0.50 | | |
| 8 | −1.875 | 0.86 | 1.71299 | 53.8 |
| 9 | −1.598 | 0.30 | | |
| 10 | ∞ | 0.70 | | |
| 11 | −38.308 | 0.20 | 1.80517 | 25.4 |
| 12 | 1.621 | 0.90 | 1.71299 | 53.8 |
| 13 | −3.191 | 0.03 | | |
| 14 | 2.248 | 0.59 | 1.77250 | 49.6 |
| 15 | 51.783 | 0.00 | | |
| 16 | ∞ | 0.78 | 1.51632 | 64.0 |
| 17 | ∞ | 1.27 | | |

TABLE 5

| | f' | I | $f_{G1}$ | $D_{G1-2}$ | $D_{G2}$ | Fno |
|---|---|---|---|---|---|---|
| Example 1 | 1.00 | 1.30 | −2.46 | 3.94 | 0.89 | 1.25 |
| Example 2 | 1.00 | 1.25 | −2.17 | 3.61 | 0.91 | 1.43 |
| Example 3 | 1.00 | 1.53 | −2.32 | 4.65 | 1.05 | 1.25 |
| Example 4 | 1.00 | 1.25 | −3.02 | 3.78 | 0.86 | 1.25 |

| | Expression (1) f'/I | Expression (2) $f'_{G1}/D_{G1-2}$ | Expression (3) $D_{G2}/D_{G1-2}$ |
|---|---|---|---|
| Example 1 | 0.77 | −0.62 | 0.23 |
| Example 2 | 0.80 | −0.60 | 0.25 |
| Example 3 | 0.65 | −0.50 | 0.23 |
| Example 4 | 0.80 | −0.80 | 0.23 |

What is claimed is:

1. A retro focus type wide-angle lens comprising, successively from an object side, a front group having a negative refracting power and a rear group having a positive refracting power; said front group comprising, successively from the object side, a first lens made of a negative meniscus lens having a convex surface directed onto the object side, a second lens made of a biconvex lens, a third lens made of a negative meniscus lens having a convex surface directed onto the object side, and a fourth lens made of a positive meniscus lens having a concave surface directed onto the object side; said rear group comprising, successively from the object side, a cemented lens in which a fifth lens made of a negative lens and a sixth lens made of a positive lens are cemented together, and a seventh lens made of a positive lens having a convex surface directed onto the object side; said retro focus type wide-angle lens satisfying the following conditional expressions (1) and (2):

$$0.6 < f'/I < 0.85 \quad (1)$$

$$0.45 < |f'_{G1}/D_{G1-2}| < 0.88 \quad (2)$$

where f' is the focal length of the whole system;

I is the diagonal length of an effective screen;

$f'_{G1}$ is the focal length of the system formed by the first to third lenses; and $D_{G1-2}$ is the distance from the object-side surface of the first lens to the imaging-side surface of the fourth lens.

2. A retro focus lens according to claim 1, satisfying the following conditional expression (3):

$$0.2 \leq D_{G2}/D_{G1-2} \leq 0.5 \quad (3)$$

where $D_{G1-2}$ is the distance from the object-side surface of the first lens to the imaging-side surface of the fourth lens; and $D_{G2}$ is the center thickness of the fourth lens.

3. A retro focus type wide-angle lens according to claim 1, further comprising a stop, disposed between said third and fourth lenses, for restricting a marginal luminous flux; and an aperture stop disposed between said fourth and fifth lenses.

4. A retro focus type wide-angle lens according to claim 1, having an F number set within the range from 1.25 to 1.43.

5. A lens apparatus comprising the retro focus type wide-angle lens according to claim 1.

* * * * *